(12) United States Patent
Leupold

(10) Patent No.: US 6,376,959 B1
(45) Date of Patent: Apr. 23, 2002

(54) MANGLE MAGNETIC STRUCTURE

(75) Inventor: Herbert A. Leupold, Eatontown, NJ (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 09/422,438

(22) Filed: Oct. 21, 1999

(51) Int. Cl.$^7$ ............................................... H02K 17/00
(52) U.S. Cl. ..................... 310/166; 310/171; 310/191
(58) Field of Search ................................ 310/166, 191, 310/156, 171, 180, 261, 254

(56) References Cited

U.S. PATENT DOCUMENTS 6,054,789 A * 4/2000 Leupold ...................... 310/156

OTHER PUBLICATIONS

O. Cugat et al, "Permanent Magnet Variable Flux Sources", IEEE Transactions Magnetics, MAG–30 (1994), p. 4602.
H.A. Leupold et al., "Design Applications of Magnetic Mirrors", J. Appl. Phys., 63 (1988), p. 3987.
H.A. Leupold et al., "Applications of yokeless flux confinement", J. Appl. Phys. 64(10) (1988), pp. 5994–5996.

\* cited by examiner

*Primary Examiner*—Nestor Ramirez
*Assistant Examiner*—Thanh Lam
(74) *Attorney, Agent, or Firm*—Michael Zelenka; George B. Tereschuk

(57) ABSTRACT

A mangle magnetic structure is composed of a plurality of transversely magnetized parallel cylindrical rods forming a cylindrical shell defining an interior cavity filled with insulated wires in parallel to the mangle's principal axis. Two semicircular sections composed of the solid copper wires, within the interior cavity, are physically separated and insulated from each other by a barrier. The transversely magnetized parallel cylindrical rods are rotatable around each rod's individual axis, causing an interior magnetic field within interior cavity and the semicircular sections. The transversely magnetized parallel cylindrical rods are rotated so that the lines of force emanating from them produce an Alternating Current axial electromotive force to drive current through the semicircular sections and to an external load. In one embodiment, two sets of concentric transversely magnetized parallel cylindrical rods form the magnetic shell.

29 Claims, 5 Drawing Sheets

MANGLE MAGNETIC STRUCTURE

GOVERNMENT INTEREST

The invention described herein may be manufactured, used, imported, sold, licensed by or for the Government of the United States of America without the payment to me of any royalty thereon.

FIELD OF THE INVENTION

The invention relates in general to permanent magnets and more particularly to a mangle magnetic structure motor and generator.

BACKGROUND OF THE INVENTION

It is often desirable to have magnetic structures that are not too brittle and will stand up to excessive stress. It is also desirable to employ less torque for rotating cylindrical rods so that activating motors can be smaller and less expensive.

The structure of the present invention is derived from the magic ring configuration described in many papers and previous patents, which is also known as the Halbach structure. The magic ring or cylinder is a cylindrical permanent magnet shell which is magnetized in the plane transversely to the cylindrical axis so that the direction of magnetization γ with respect to the polar plane varies twice as rapidly as the azimuthal coordinate, φ, according to the formula:

$$\gamma = 2\phi$$

The polar plane is the plane that includes the cylindrical axis and the polar lines. Such as arrangement produces very high fields in its interior in proportion to its mass and bulk and is depicted in FIG. 1. Referring now to FIG. 1, there is depicted a magic ring segment 10 having a central cavity 11, annular shell 12, a magnetic field, indicated by large arrow 13, direction of magnetization indicated by smaller arrows 14 and polar plane 15. For example, at point A, the coordinate, φ, is 22.5° while the direction of magnetization, according to this formula is 45°.

The magic ring may be approximated by arranging transversely magnetized parallel cylindrical rods in a bundled cylindrical shell depicted in FIG. 2, known as a "mangle." Mangle structures are described in [J. M. D. Coey and O. Cugat, 13$^{th}$ Int. Workshop on Rare Earth Permanent Magnets and Their Applications, Birmingham, U.K., P4, 11–14, September (1994) and] O. Cugat, P. Hanson and J. M. D. Coey, IEEE Transactions Magnetics, MAG-30 (1994), pg. 4602. Although mangles produce less field for their mass and bulk than cylinders, they are much easier to manufacture because they are composed of identical parts all magnetized in the same way. Referring now to FIG. 2, there is depicted a magic mangle structure [20], with a shell 20 composed of a group of magnetic rods 21 that are magnetized as indicated by small arrows 22 and a magnetic field represented by large arrow 23. Because shell 20 [23] is composed of a series of rods it is lighter than the solid structure annular shell 12, which is depicted FIG. 1.

The present invention provides mangle cylindrical magnetic structures that overcome the problems, difficulties and shortcomings associated with brittle magnetic structures that cannot withstand excessive stress. The present invention's mangle cylindrical magnetic structures are lighter and therefore require less torque for rotating cylindrical rods permitting widespread use with smaller and less expensive activating motors, without suffering from the disadvantages and shortcomings of prior art structures. By advantageously bundling a set of transversely magnetized parallel cylindrical rods into a rotatable magnetic shell enclosing a cavity having wires parallel to the principal axis, the present invention provides a mangle generator that is simple and inexpensive to manufacture and operate.

Other references on mangle and magic ring magnetic structures are [K. Halbach, Nuclear Instr. And Math, 169 (1980) p. 1.; K. Halbach, Nuclear Instr. And Math, 187 (1981) p. 109; H. Zijlstra, Philips J. Research, 40 (1985) p. 259; and] H. A. Leupold et al., J. Appl. Phys., 63 ([1989] 1988) p. [3487] 3987 and 64 ([1959]1988) p. 5994.

SUMMARY OF THE INVENTION

It is an object of the present invention to provide mangle cylindrical magnetic structures.

Another object of the present invention is to provide mangle cylindrical magnetic structures by bundling at least two concentric sets of transversely magnetized parallel cylindrical rods into a rotatable magnetic shell enclosing a cavity having wires parallel to the principal axis.

These and other objects are advantageously accomplished with the present invention by bundling a set of transversely magnetized parallel rotatable cylindrical rods to form a magnetic shell enclosing an interior cavity. The interior having wires parallel to the principal axis, and two semicircular sections which are connected to a load outside the shell. In alternative embodiments, the present invention provides a structure for each end of the bundles to bear a load between semi-cylinders and for two sets of concentric transversely magnetized parallel rotatable cylindrical rods.

DETAILED DESCRIPTION OF THE DRAWINGS

Figure 1:
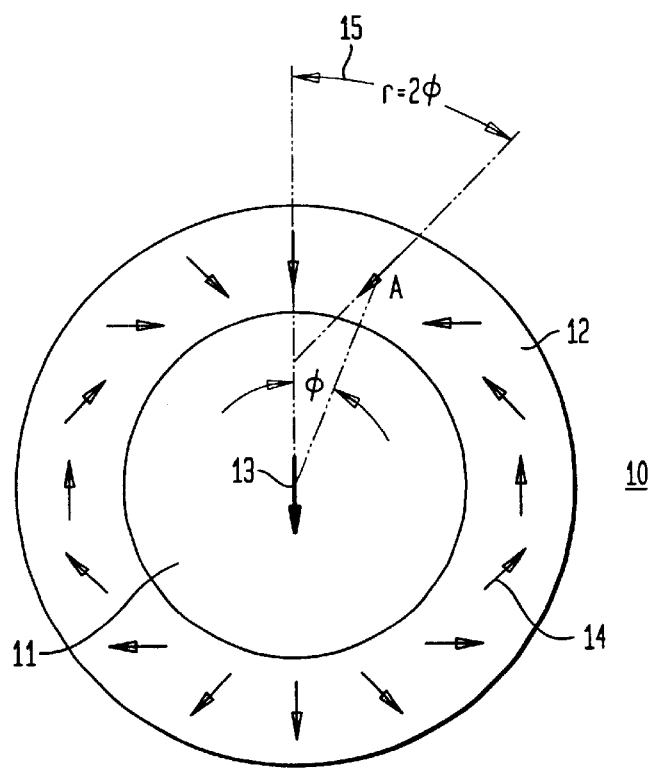
FIG. 1 is a cross sectional view of the magnetic field generated within one magic ring section.
Figure 2:
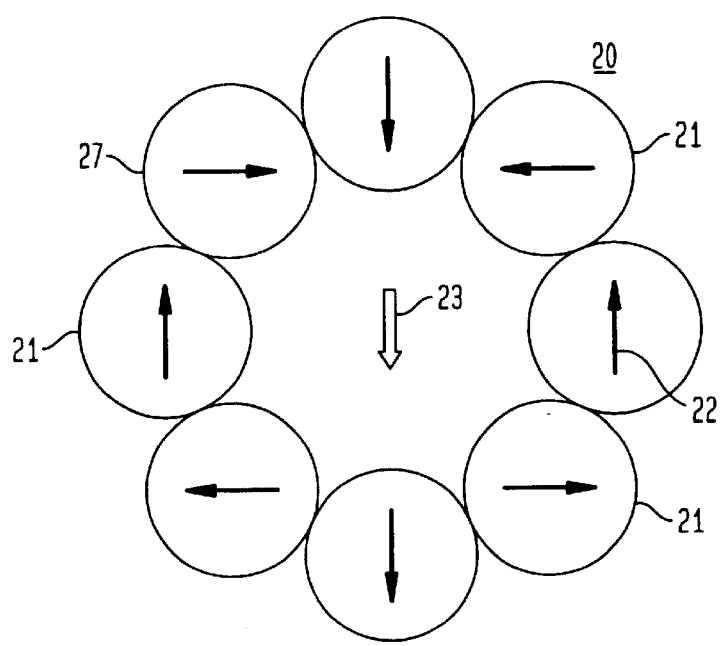
FIG. 2 is a simplified mangle magnetic structure.
Figure 3A:
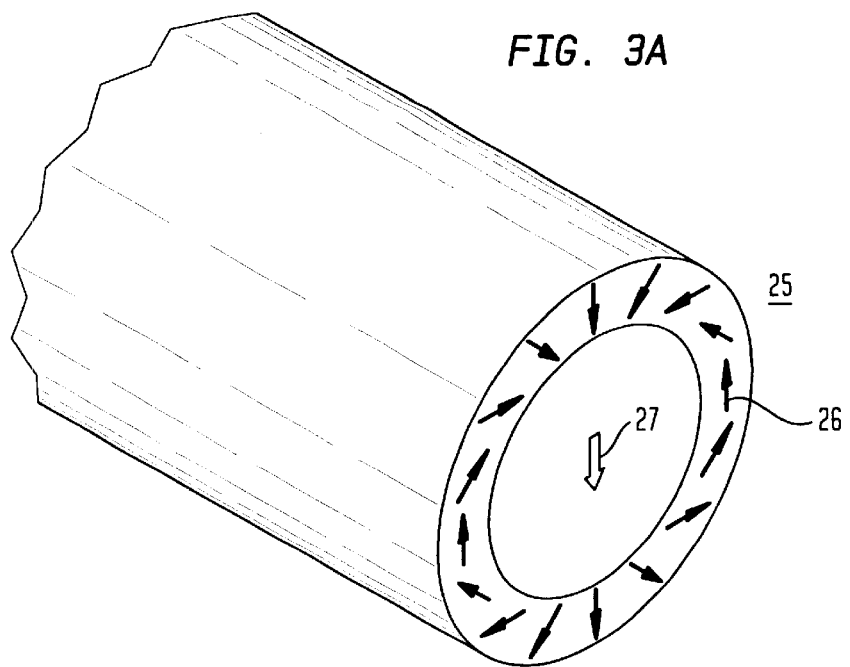
FIGS. 3A–3B are perspective views comparing a magic cylinder structure with a simplified mangle magnetic structure.
Figure 3B:
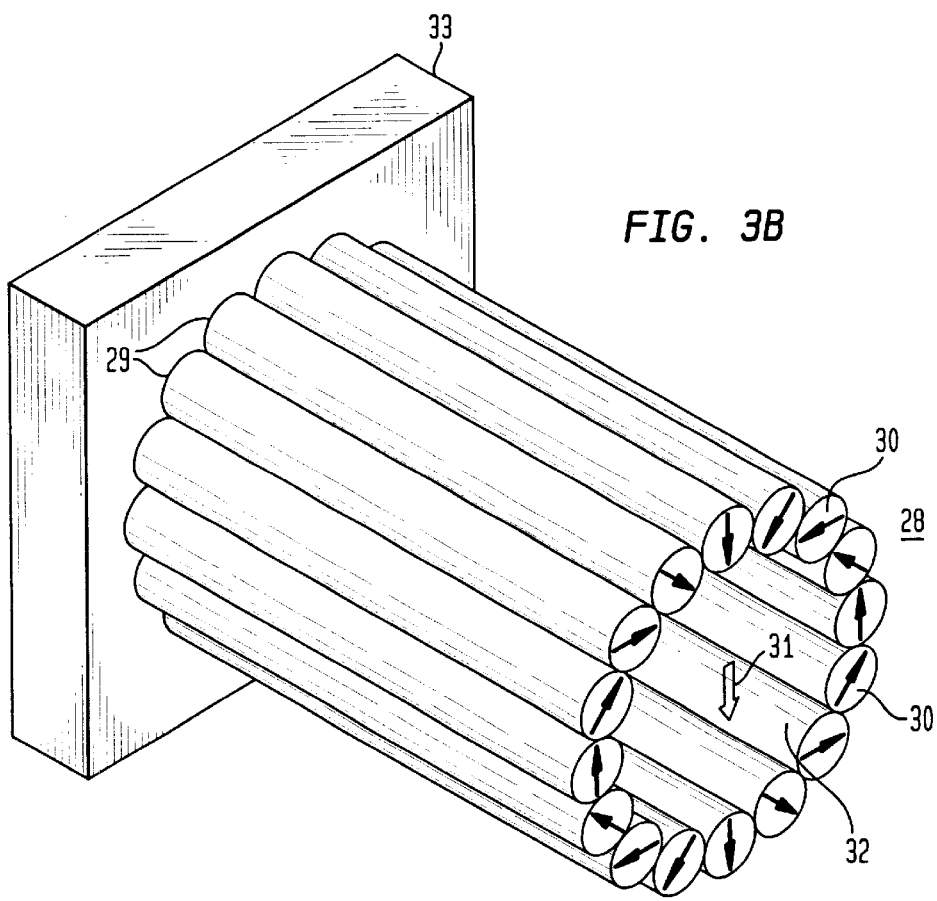

FIGS. 1 and 2 were previously described in the Background of the Invention. FIGS. 3A–3B are perspective views comparing a magic cylinder structure with a simplified mangle magnetic structure. Referring now to FIG. 3A, magic cylinder structure 25 is depicted with smaller arrows 26 representing the direction of magnetization and larger arrow 27 indicating the magic cylinder's magnetic field. FIG. 3B depicts a simplified mangle shell 28 comprising a plurality of transversely magnetized parallel cylindrical rods 29. The smaller arrows 30 represent the direction of magnetization in each rod 29 and larger arrow 31 indicating the magnetic field of the mangle structure. The transversely magnetized parallel cylindrical rods 29 are all rotated by a rotation means included in frame 33, which is used in all this invention's embodiments. The mangle's interior cavity 32 can be filled with a number of different conductors and materials in order to achieve several advantageous circuit configurations.

Figure 5A:
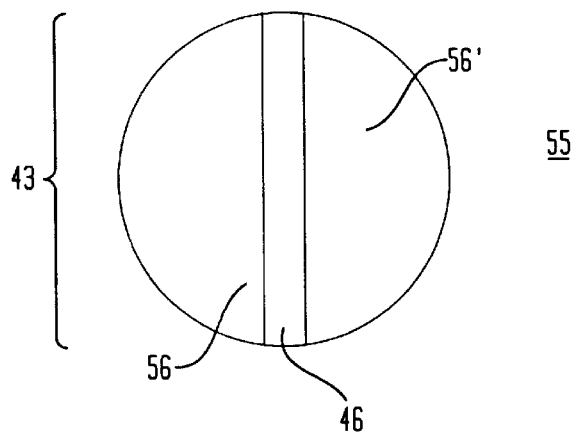
FIGS. 5A–5C are cross sectional end views of different mangle core circuits.
Figure 5B:
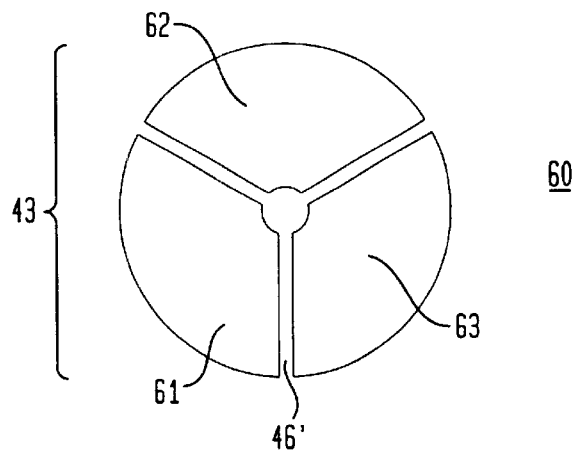
Figure 5C:
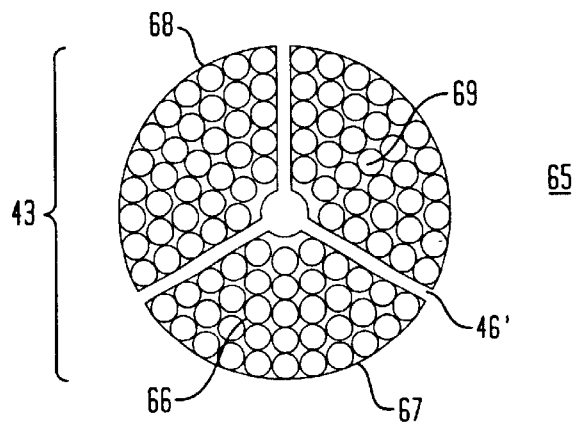

Although mangles produce less field for their mass and bulk than cylinders, they are much easier to manufacture because the transversely magnetized parallel cylindrical rods 29 are identical parts all magnetized in the same way. The present invention provides mangle cylindrical magnetic structures with differently configured interior cores, some of which are depicted in FIGS. 5A–5C for generator applications.

Figure 4:
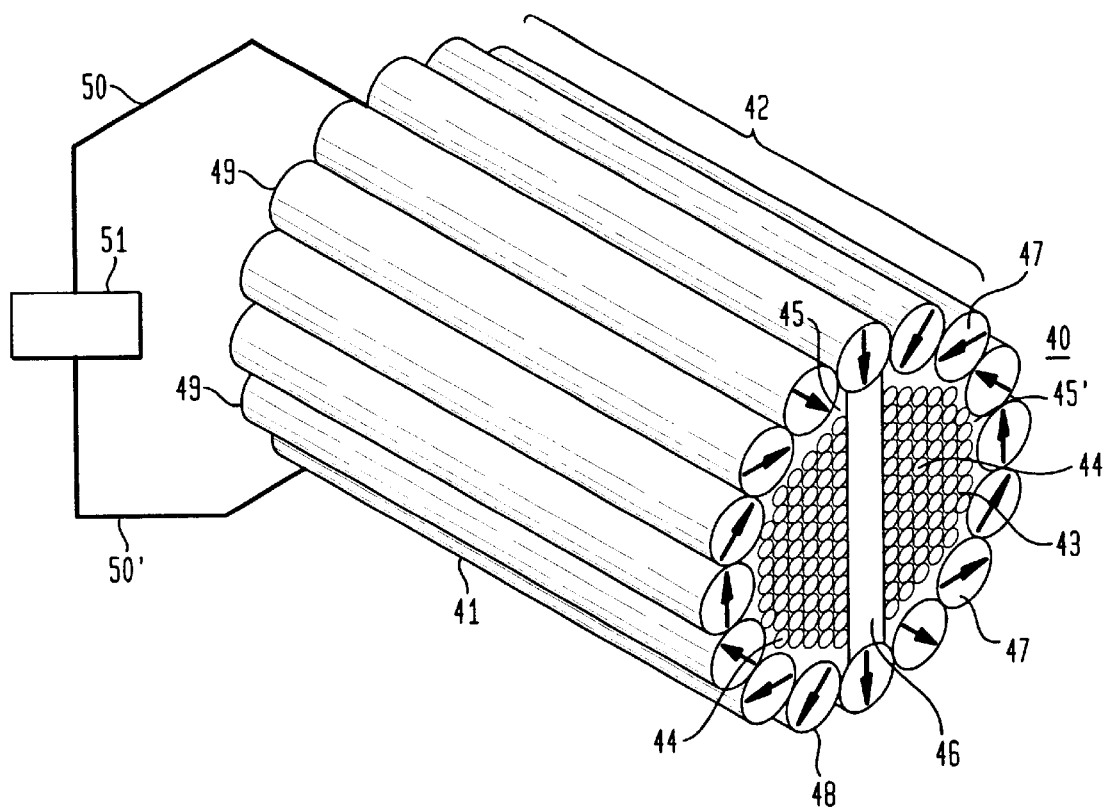
FIG. 4 is a perspective view of one embodiment of a mangle generator of the present invention.

Referring now to FIG. 4, there is depicted a mangle generator 40, composed of a plurality of transversely magnetized parallel cylindrical rods 41 forming a cylindrical shell 42 defining an interior cavity 43. The interior cavity 43 is filled with a plurality of [insulated] wires 44 in parallel to the mangle's principal axis. In this configuration, two semicircular sections 45 and 45' composed of the solid copper wires 44, within interior cavity 43 are physically separated and insulated from each other by a barrier 46. The plurality of transversely magnetized parallel cylindrical rods 41 are rotatable around each rod's individual axis, causing the interior magnetic field within interior cavity 43 and the semicircular sections 45 and 45'. The plurality of transversely magnetized parallel cylindrical rods 41 are rotatable around said interior cavity 43 and semicircular copper sections 45 and 45' through the rotating means in a frame, not shown. The direction of magnetization for each of the plurality of transversely magnetized parallel cylindrical rods 41 are indicated by arrows 47. Mangle generator 40 having a first end 48 and a second end 49. The second end 49 is connected to wires 50 and 50' to a load 51 placed outside cylindrical shell 42.

In operation, the plurality of transversely magnetized parallel cylindrical rods 41 are rotated so that the lines of force emanating from them would produce an Alternating Current axial electromotive force to drive current through the copper sections 45 and 45' and to external load 51. By contrast, a rotating cylindrical shell in a magic cylinder arrangement has a large moment of inertia and hence considerable centripetal force especially at high speeds. Prior art high-energy magnets are generally too brittle and frangible and could not stand up to the excessive stresses caused by such high-speed centripetal forces.

To alleviate the problem of brittleness at high speeds, a theorem is used stating that for any cylindrical distribution of magnetization if all magnetization vectors are rotated by an angle +σ in the x y plane, the field everywhere will remain constant in magnitude and rotate in the opposite direction by an angle −σ. This means that if all the magnetized cylinders in the magic mangle are rotated simultaneously in the same sense about their individual axes, the magnetic field in its interior core will rotate in the opposite direction. Thus, the same effect is produced as if the cylindrical shell 42 rotates as a whole, but with a smaller angular momentum. In this connection, cylindrical is used in its most general sense, i.e. having no dependence on location in the axial, (Z), direction and being essentially two-dimensional. For example the angular momentum of the magic mangle, when rotating as a whole, is derived according to the formula:

$$Nmr_c^2 + N/2ma^2$$

where m is the mass of a single transversely magnetized parallel cylindrical rod 41, r is the distance to the center of each rod from the center of the cylindrical shell 42 and a is the radius of each rod 41. If each rod 41 rotates separately about its own axis, the total angular momentum of the assembly is as follows:

$$\frac{N}{2}ma^2$$

where N is the number of rods. In the FIG. 4 cylindrical shell 42, for example, $r_c=3a$ approximately so that the ratio R of the moment of inertia of the total assembly to that of the sum of the individual rods is given by the formula:

$$R = \frac{Nmr_c^2 + \frac{N}{2}ma^2}{\frac{N}{2}ma^2} = \frac{2r_c^2}{a^2+1}$$

If as in this configuration $r_c\approx 3a$, the $R\approx 19$.

This means that with the rods 41 rotating individually only one nineteenth (1/19) of the torque is necessary to accelerate to a given velocity in a given response time, allowing the activating motors to be appropriately smaller and less massive.

Also a small piece of magnet on the rim of cylindrical shell 42 must be held in place by a force of $mw^2r$, so that when cylindrical shell 42 rotates as a whole, its outermost r is about 4 times that of an individually rotating rod 41. In this way, the force tending to tear the magnet apart at the point is likewise 4 times as great necessitating more heroic measures to keep it intact at high frequencies.

FIGS. 5A–5C are cross sectional views of alternative embodiments of the present invention with several interior core variations of the FIG. 4 preferred embodiment, where like numerals are employed for like structural elements. FIG. 5A depicts a single phase generator 55 having 2 semi-cylindrical copper bars 56 and 56' disposed within the interior cavity 43 of cylindrical shell 42 and separated by barrier 46. Referring now to FIG. 5B, three one-third cylindrical sections of solid copper 61, 62 and 63 are disposed within interior cavity 43, and when properly connected exterior to the cylindrical shell 42, a three-phase circuit 60 is provided. FIG. 5C depicts an interior core 43 composed a plurality of wires 66 separated into three sections 67, 68 and 69 by barrier 46' to provide another three phase circuit 65. It is also within the contemplation of the present invention to employ the mangle magnetic structure as a motor.

Figure 6:
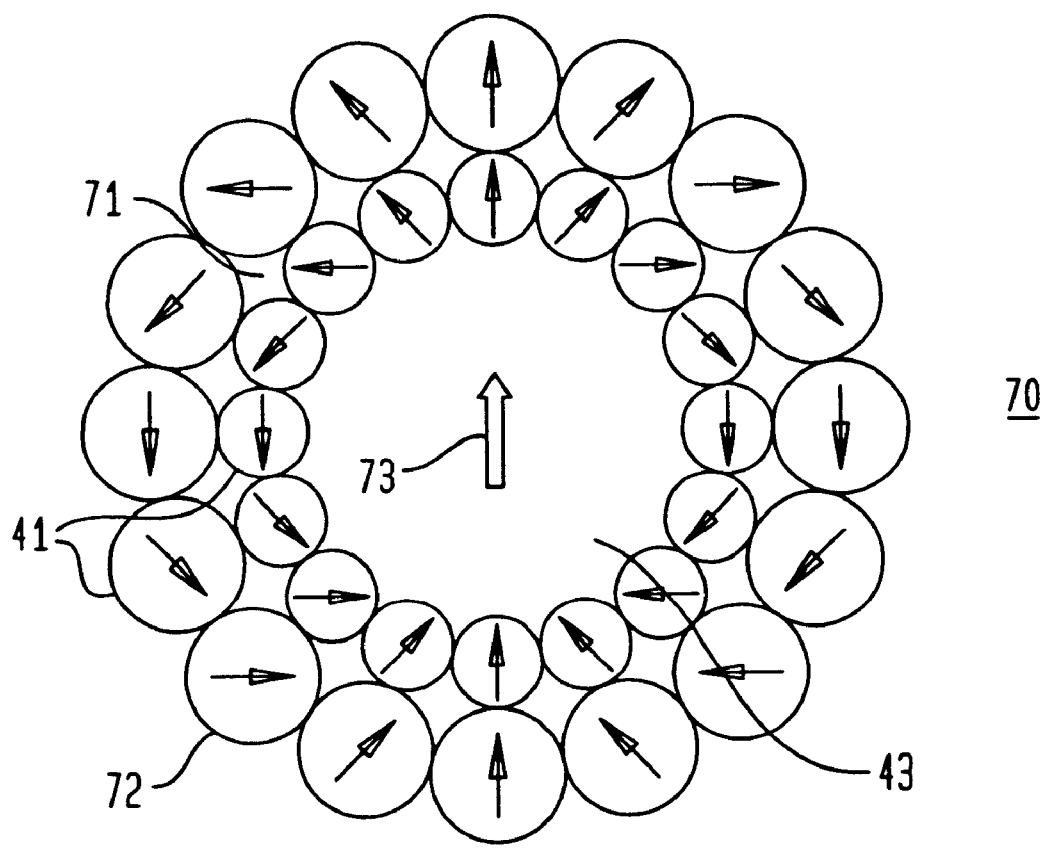
FIG. 6 depicts a frontal view of the preferred embodiment of the mangle cylindrical magnetic structure of the present invention.

FIG. 6 depicts a cross sectional view of layered magnetic mangle cylindrical structure 70 comprising an interior layer 71 of transversely magnetized parallel cylindrical rods 41 surrounding an interior cavity 43 and an outer layer 72 of transversely magnetized parallel cylindrical rods 41. Large arrow 73 within the interior cavity 43 indicates the magnetic field of this structure. Each of the rods 41 in layers 71 and 72 rotate individually through a rotating means in a frame 33, not shown. This layered magnetic mangle cylindrical structure 70 approximates the double layered counter rotating magic cylinder structure disclosed in Ser. No. 09/507,296 which is incorporated herein by reference. Much less angular momentum is stored in this structure 70 when all rods 41 turn individually at W in both structures.

Additionally, while several embodiments have been illustrated and described, it will be obvious to those skilled in the art that various modifications may be made without departing from the spirit and scope of this invention.

What I claim is:

1. A mangle magnetic structure, comprising
    a plurality of transversely magnetized parallel cylindrical rods are bundled in a cylindrical shell along a longitudinal axis, each of said cylindrical rods having a direction of magnetization;

said cylindrical shell being mounted in a frame defines a hollow core having an interior magnetic field;

a conductor is disposed within said core;

rotating said plurality of transversely magnetized parallel cylindrical rods together in a given direction, by a means for rotation in said frame, causing said interior magnetic field to rotate in an opposite direction from said given direction;

said interior magnetic field producing a current through said conductor;

said cylindrical shell providing magnetic lines of force to produce an alternating current axial electromotive force to drive current through said conductor;

a cylindrical distribution of magnetization in said plurality of transversely magnetized parallel cylindrical rods when all magnetization vectors are rotated by an angle +σ in the x y plane causing the interior magnetic field to remain constant in magnitude;

said interior magnetic field rotates direction by an angle −σ;

said mangle magnetic structure having an angular momentum, when rotating as a whole, derived from the formula:

$$Nm r_c^2 + \frac{N}{2}ma^2$$

where said m is the mass of one of said transversely magnetized parallel cylindrical rods, said $r_c$ is the distance to a center of each of said plurality of transversely magnetized parallel cylindrical rods from a center of said cylindrical shell; and said a is the radius of each of said plurality of transversely magnetized parallel cylindrical rods.

2. The mangle magnetic structure, as recited in claim 1, further comprising a total angular momentum of said structure when each of said plurality of transversely magnetized parallel cylindrical rods rotates separately about its own axis according to the formula:

$$\frac{N}{2}ma^2$$

where said N is the number of said plurality of transversely magnetized parallel cylindrical rods in said mangle structure.

3. The mangle magnetic structure, as recited in claim 2, further comprising the ratio R of the moment of inertia of said structure to the moment of inertia of the sum of the individual rods according to the formula:

$$R = \frac{Nm r_c^2 + \frac{N}{2}ma^2}{\frac{N}{2}ma^2} = \frac{2r_c^2}{a^2} + 1$$

4. The mangle magnetic structure, as recited in claim 3, further comprising said conductor being a plurality of wires disposed within said core along said longitudinal axis.

5. The mangle magnetic structure, as recited in claim 4, further comprising said plurality of wires being divided into two semicircular sections separated from each other by a barrier.

6. The mangle magnetic structure, as recited in claim 5, further comprising said semicircular sections being insulated from each other by said barrier.

7. The mangle magnetic structure, as recited in claim 6, wherein said structure functions as a generator.

8. The mangle magnetic structure, as recited in claim 7, further comprising connecting said structure to a load to perform work.

9. The mangle magnetic structure, as recited in claim 8, further comprising said plurality of transversely magnetized parallel cylindrical rods being at least 8 rods.

10. The mangle magnetic structure, as recited in claim 9, wherein said plurality of transversely magnetized parallel cylindrical rods is 8 rods.

11. The mangle magnetic structure, as recited in claim 3, further comprising said conductor being two semi-cylindrical copper bars disposed within said interior cavity.

12. The mangle magnetic structure, as recited in claim 11, further comprising said semi-cylindrical copper bars being separated from each other by a barrier.

13. The mangle magnetic structure, as recited in claim 12, further comprising said semi-cylindrical copper bars being insulated from each other by said barrier.

14. The mangle magnetic structure, as recited in claim 13, wherein said structure functions as a single-phase generator.

15. The mangle magnetic structure, as recited in claim 14, further comprising connecting said structure to a load to perform work.

16. The mangle magnetic structure, as recited in claim 3, further comprising said conductor being three one-third cylindrical copper bars disposed within said interior cavity.

17. The mangle magnetic structure, as recited in claim 16, further comprising said three one-third cylindrical copper bars being separated from each other by a barrier.

18. The mangle magnetic structure, as recited in claim 17, further comprising said three one-third cylindrical copper bars being insulated from each other by said barrier.

19. The mangle magnetic structure, as recited in claim 18, wherein said structure functions as a three-phase magnetic circuit.

20. The mangle magnetic structure, as recited in claim 3, further comprising a plurality of wires being divided into three one-third cylindrical sections separated from each other by a barrier.

21. The mangle magnetic structure, as recited in claim 20, further comprising said one-third cylindrical sections being insulated from each other by said barrier.

22. The mangle magnetic structure, as recited in claim 21, wherein said structure functions as a three-phase magnetic circuit.

23. The mangle magnetic structure, as recited in claim 3, further comprising:

said plurality of transversely magnetized parallel cylindrical rods being an inner layer; and a second plurality of transversely magnetized parallel cylindrical rods disposed adjacent to said inner layer form an outer layer.

24. A mangle magnetic generator, comprising:

a plurality of transversely magnetized parallel cylindrical rods are bundled in a cylindrical shell, each of said cylindrical rods having a direction of magnetization;

said cylindrical shell, having a longitudinal axis, defines a hollow core having an interior magnetic field;

a conductor is disposed within said core parallel to said longitudinal axis;

rotating said plurality of transversely magnetized parallel cylindrical rods together in a given direction, by a means for rotation, causing said interior magnetic field to rotate in an opposite direction from said given direction;

said interior magnetic field rotates direction by an angle −σ;

said generator having an angular momentum, when rotating as a whole, derived from the formula:

$$Nmr_c^2 + N/2ma^2$$

where said m is the mass of one of said transversely magnetized parallel cylindrical rods, said $r_c$ is the distance to a center of each of said plurality of transversely magnetized parallel cylindrical rods from a center of said cylindrical shell and said a is the radius of each of said plurality of transversely magnetized parallel cylindrical rods; and said interior magnetic field producing a current through said conductor.

25. The mangle magnetic generator, as recited in claim 24, further comprising:

said plurality of insulated wires being divided into two semicircular sections composed of the solid copper wires; and said semicircular sections being separated from each other by a barrier.

26. The mangle magnetic generator, as recited in claim 25, further comprising said semicircular sections being insulated from each other by said barrier.

27. The mangle magnetic generator, as recited in claim 25, further comprising connecting said generator to a load to perform work.

28. The mangle magnetic generator, as recited in claim 27, further comprising said plurality of transversely magnetized parallel cylindrical rods being at least 8 rods.

29. The mangle magnetic generator, as recited in claim 28, wherein said plurality of transversely magnetized parallel cylindrical rods is 8 rods.

* * * * *